United States Patent
Ennis et al.

(10) Patent No.: US 7,550,539 B2
(45) Date of Patent: Jun. 23, 2009

(54) PARTIALLY NEUTRALIZED CHLOROSULFONATED POLYOLEFIN ELASTOMERS

(75) Inventors: Royce Elton Ennis, Silsbee, TX (US); Furman Eugene Glenn, Sr., Louisville, KY (US)

(73) Assignee: Dupont Performance Elastomers LLC, Wilmington, DE (US)

( * ) Notice: Subject to any disclaimer, the term of this patent is extended or adjusted under 35 U.S.C. 154(b) by 0 days.

(21) Appl. No.: 12/075,647

(22) Filed: Mar. 13, 2008

(65) Prior Publication Data

US 2008/0249253 A1 Oct. 9, 2008

Related U.S. Application Data

(60) Provisional application No. 60/921,607, filed on Apr. 3, 2007.

(51) Int. Cl.
 C08C 19/12 (2006.01)
 C08C 19/20 (2006.01)
 C08C 19/42 (2006.01)
 C08L 23/34 (2006.01)
 C08F 8/38 (2006.01)
 C08F 8/44 (2006.01)

(52) U.S. Cl. .................. 525/333.9; 525/343; 525/344; 525/353; 525/354; 525/355; 525/357; 525/366; 525/370; 525/379

(58) Field of Classification Search ............. 525/333.9, 525/343, 344, 353, 354, 355, 356, 357, 366, 525/370, 379
See application file for complete search history.

(56) References Cited

U.S. PATENT DOCUMENTS

| 4,560,731 | A | 12/1985 | Rifi |
| 5,102,946 | A | 4/1992 | Chen et al. |
| 5,668,220 | A | 9/1997 | Effler, Jr. et al. |
| 7,273,908 | B2 | 9/2007 | Ito et al. |

FOREIGN PATENT DOCUMENTS

| EP | 0131948 A2 | 1/1985 |
| EP | 131948 A2 * | 1/1985 |
| JP | HEI2-18681 | 1/1990 |
| JP | HEI9-124865 | 5/1997 |

OTHER PUBLICATIONS

Chemical Abstract Service—Japanese Patent Application Kokai 60001206, published Jan. 7, 1985.
Chemical Abstract Service—Japanese Patent Application Kokai 60155205, published Aug. 15, 1985.
U.S. Appl. No. 12/075,525, filed Mar. 12, 2008, Gadkari.
U.S. Appl. No. 12/075,770, filed Mar. 13, 2008, Ennis.
U.S. Appl. No. 12/075,768, filed Mar. 13, 2008, Ennis et al.
U.S. Appl. No. 12/075,769, filed Mar. 13, 2008, Ennis et al.
T. Huff and B. H. Johnson, The Preparation of Crystalline Polypropylene Sodium Sulfonates and Their Interaction with an Included Sodium Hydroxide Phase, Journal of Applied Polymer Science, 1973, pp. 553-564, vol. 17, John Wiley & Sons, Inc., USA.

* cited by examiner

Primary Examiner—Roberto Rábago

(57) ABSTRACT

At least partially neutralized chlorosulfonated ethylene/alpha-olefin elastomers containing 0.5-10 weight percent chlorine and 0.25 to 5 weight percent sulfur are prepared from ethylene/alpha-olefin copolymer base resins having a ratio of weight average molecular weight (Mw) to number average molecular weight (Mn) less than 3.5.

10 Claims, No Drawings

PARTIALLY NEUTRALIZED CHLOROSULFONATED POLYOLEFIN ELASTOMERS

CROSS-REFERENCE TO RELATED APPLICATIONS

This application claims the benefit of U.S. Provisional Application No. 60/921,607 filed Apr. 3, 2007.

FIELD OF THE INVENTION

This invention relates to partially neutralized chlorosulfonated polyolefin elastomers, more particularly to chlorosulfonated ethylene/alpha-olefin copolymers having a plurality of —$SO_3M$ groups, wherein M is a cation.

BACKGROUND OF THE INVENTION

Chlorosulfonated polyethylene elastomers and chlorosulfonated ethylene copolymer elastomers have been found to be very good elastomeric materials for use in applications such as wire and cable jacketing, molded goods, automotive hose, power transmission belts, roofing membranes and tank liners. These materials are noted for their balance of oil resistance, thermal stability, ozone resistance and chemical resistance.

Historically, a wide variety of polyolefin polymers, including ethylene and propylene homopolymers and copolymers, have been utilized as the starting polymers (i.e. "base polymers" or "base resins") for manufacture of chlorosulfonated products. The majority of base polymers employed in the manufacture of chlorosulfonated elastomers have been polyethylene types, e.g. low density polyethylene (LDPE), linear low density polyethylene (LLDPE) and high density polyethylene (HDPE). Most of the ethylene homopolymers and copolymers employed to make these elastomers are polymerized by a high pressure free radical catalyzed process or by a low pressure process using Ziegler-Natta or Phillips type catalysts.

Chlorosulfonated elastomers based on highly branched LDPE usually have desirable extrusion and flow properties, but low physical properties. Chlorosulfonated elastomers based on linear HDPE or LLDPE base polymers generally have superior physical properties, but inferior extrusion properties.

U.S. Pat. No. 5,668,220 discloses chlorinated and chlorosulfonated elastomers that contain 20-50 weight percent chlorine and 0.8-2.5 weight percent sulfur. These elastomers are made from ethylene/alpha-olefin copolymers that were polymerized in the presence of a single site or metallocene catalyst. Such ethylene copolymers have improved extrusion or flow properties when compared to polymers having the same molecular weight distribution, but produced using a Ziegler-Natta catalyst.

Japanese Kokai Hei 2[1990]-18681 discloses polyolefin ionomers containing —$SO_3M$ groups, where M is a univalent cation. The ionomers are made by reacting a portion of the —$SO_2Cl$ groups on a chlorosulfonated polyolefin with base. Chlorosulfonated polyethylene is described as having between 25-36% chlorine. However, ionomers made from chlorosulfonated ethylene/alpha-olefins of the type taught in U.S. Pat. No. 5,688,220 are not disclosed.

Ethylene based elastomers (e.g. EP and EPDM) are utilized as viscosity modifiers for oils in automotive and industrial applications. These polymers are readily soluble and stable in paraffinic and naphthenic oils whereas more polar polymers (e.g. ethylene acrylic or methacrylic copolymers and highly chlorinated ethylene polymers) are not. Some of these oil additive polymers are also functionalized with reactive groups in order to incorporate stabilizers for oil systems.

It would be desirable to have partially neutralized (i.e. ionomers) of chlorosulfonated ethylene/alpha-olefin copolymers having less than 20 weight percent chlorine and a low level of residual crystallinity for use in oil based solutions and emulsions. In some of these applications where solution viscosity must be balanced with oil solubility and polymer thermal stability, it would be desirable to employ copolymers manufactured with a single site catalyst.

SUMMARY OF THE INVENTION

An aspect of the present invention is a chlorosulfonated ethylene copolymer composition comprising at least one chlorosulfonated ethylene copolymer having 0.5 to 10 weight percent chlorine, 0.25 to 5 weight percent sulfur, based on total weight of said chlorosulfonated ethylene copolymer, and a plurality of —$SO_3M$ groups, wherein M is a cation, and wherein each of said chlorosulfonated ethylene copolymers is produced from a different linear olefin copolymer comprising copolymerized units of 45 to 80 weight percent ethylene and 55 to 20 weight percent, based on total weight of said linear olefin copolymer, of an alpha-olefin having 3 to 20 carbon atoms, said linear olefin copolymer having a ratio of Mw/Mn less than 3.5.

DETAILED DESCRIPTION OF THE INVENTION

The chlorosulfonated elastomer composition of this invention is made by at least partially neutralizing with base a portion of the pendant —$SO_2Cl$ groups on at least one chlorosulfonated ethylene/alpha-olefin copolymer (described hereinafter). Typically only about 10 to 90% (as evidenced by FTIR measurements or titration analysis) of the —$SO_2Cl$ groups react with base to form a plurality of —$SO_3M$ groups, so that the elastomers are termed "partially neutralized". However, completely neutralized compositions are also part of this invention.

Properties of the chlorosulfonated elastomer compositions of this invention can be tailored for certain end use applications by employing blends of two or more different (e.g. different comonomers, different molecular weight distributions, etc.) chlorosulfonated ethylene/alpha-olefin copolymers, each having a plurality of —$SO_3M$ groups.

In the neutralization process, at least one chlorosulfonated ethylene/alpha-olefin copolymer is first dissolved in a solvent such as carbon tetrachloride, tetrachloroethylene or xylene at about 40° C. Optionally, rather than starting with solid chlorosulfonated polymer that must be dissolved, a solution of at least one chlorosulfonated polymer made from the chlorosulfonation process described hereinafter (after degassing) can be utilized. A quantity of demineralized water is added to the solution. Next, an aqueous solution of a base, e.g. sodium hydroxide, is added to the copolymer solution and the resulting liquid mixed at high shear rate for the desired time. The amount of base added is typically between 0.5 and 2.5 molar equivalents of base per equivalent of —$SO_2Cl$ groups on the copolymer. Optionally, the base is added in the form of an emulsion comprising a) demineralized water, b) base, c) compatibilizer such as a nonionic or ionic surfactant (e.g. sodium lauryl sulfate, Triton® X-100, etc.), sodium stearate, a metal rosin soap, or quaternary ammonium salt, and d) a solvent (e.g. carbon tetrachloride, tetrachloroethylene or xylene). The resulting polymer may be isolated by a variety of techniques such as precipitation by addition of a non-solvent (e.g.

methanol or isopropanol) and then drying recovered polymer in a vacuum oven, or by steam stripping the solution to remove solvent and then drying recovered polymer in a vacuum oven. A preferred isolation process is drum drying where the polymer solution is contacted with a heated drum that flashes the solvent, depositing the polymer as a thin film that is removed to recover the polymer.

The resulting at least partially neutralized chlorosulfonated ethylene-alpha-olefin copolymer contains a plurality of —$SO_3M$ groups where M is a cation. The cation, M, originates with the base employed in the neutralization reaction and may be univalent or multivalent. M is preferably sodium ion. Examples of bases that may be utilized in the neutralization reaction include, but are not limited to sodium hydroxide, sodium carbonate, potassium hydroxide, lithium hydroxide, magnesium hydroxide, calcium hydroxide, aluminum hydroxide, sodium salts of fatty acids and tertiary amine bases such as alkyl tertiary amines and various ethoxylated tertiary amines. A combination of inorganic and organic base may be employed.

The chlorosulfonated ethylene/alpha-olefin copolymers employed in this invention contain between 0.5 and 10 (preferably between 0.75 and 8, most preferably between 1 and 5) weight percent chlorine and between 0.25 and 5 (preferably between 0.35 and 3, most preferable between 0.5 and 2) weight percent sulfur. These copolymers may be made in a solution process (meaning that the ethylene/alpha-olefin base polymer is dissolved in a solvent) by either reaction with $Cl_2$ and $SO_2$ or reaction with sulfuryl chloride ($SO_2Cl_2$).

In the $Cl_2/SO_2$ chlorosulfonation process, a solvent mixture of carbon tetrachloride and chloroform is introduced to a reactor having a condenser and pressure control. Next, a quantity of at least one ethylene/alpha-olefin copolymer is added to the reactor. Optionally, more than one ethylene/alpha-olefin copolymer may be added to the reactor so as to result in a blend of chlorosulfonated ethylene/alpha-olefin copolymers. If desired, any moisture present in the reactor may be removed by addition of a small amount of a chemical moisture scavenger (e.g. thionyl chloride or acetyl chloride). Optionally, moisture can be removed by pulling a vacuum on the reactor to flash a small amount of solvent which contains the lower boiling water/solvent azeotrope. An azo initiator (e.g. Vazo® 52 available from DuPont) is introduced and the reactor purged with nitrogen to remove oxygen. The reactor is heated to about 85° C. to quickly dissolve all of the copolymer. After reducing the temperature to 55°-60° C., chlorine gas, sulfur dioxide and additional initiator is introduced to the reactor. When a desired level of chlorosulfonation has occurred, the reaction mass is degassed with nitrogen, followed by application of a vacuum. Optionally, an epoxide, e.g. Epon® 828 (available from Hexion Specialty Chemicals), is added to stabilize the product. Also optionally, an antioxidant, e.g. Irganox® 1010 (available from Ciba Specialty Chemicals) is added to protect the polymer during storage. The resulting chlorosulfonated polymer solution can be stored or used directly in the above-described neutralization process. Optionally, the chlorosulfonated polymer may be isolated from solvent prior to use in the neutralization process.

The $SO_2Cl_2$ chlorosulfonation process differs from the $Cl_2/SO_2$ process in that sulfuryl chloride and an optional amine activator (e.g. pyridine, 1,8-diazabicyclo[5.4.0]undec-7-ene (DBU), etc.), rather than a chlorine gas/sulfur dioxide mixture, is employed to chlorosulfonate the ethylene copolymer.

Some of the ethylene/alpha-olefin copolymers employed to make the partially neutralized chlorosulfonated copolymers of the invention are commercially available under the trade names Affinity® or Engage® resins from The Dow Chemical Company, Exact® or Vistalon® from ExxonMobil and Tafmer® from Mitsui. Other ethylene/alpha-olefin copolymers containing hexene-1 can also be utilized.

These copolymers comprise 45 to 80 (preferably 50 to 75, most preferably 55 to 75) weight percent copolymerized units of ethylene and 55 to 20 (preferably 50 to 25, most preferably 45 to 25) weight percent of an alpha-olefin. The alpha-olefin may be any unbranched alpha-olefin containing between 3 and 20 carbon atoms. Octene-1, butene-1 and propylene are preferred alpha-olefins. The copolymers may be semi-crystalline or amorphous. Semi-crystalline copolymers are preferred because they are easier to handle.

The ethylene/alpha-olefin copolymers are made in the presence of a single site or metallocene catalyst resulting in a substantially linear copolymer. Due to the catalyst employed in the polymerization process, these copolymers also have a relatively narrow molecular weight distribution, Mw/Mn, of less than 3.5, preferably less 3.0. The density of these copolymers is between 0.85 and 0.91 g/cm$^3$, preferably between 0.860 and 0.900 g/cm$^3$.

The partially neutralized chlorosulfonated ethylene/alpha-olefin elastomers of this invention have a variety of end uses such as viscosity modifiers, adhesives, compatibilizers, cured and uncured elastomeric systems, impact modifiers and organosol components.

Compounds of the partially neutralized chlorosulfonated copolymers of the invention may be formulated to contain curatives and other additives typically employed in traditional chlorosulfonated polyolefin compounds.

Useful curatives include bismaleimide, peroxides (e.g. Di-Cup®), sulfur donors (e.g. dithiocarbamyl polysufides) and metal oxides (e.g. MgO).

Examples of additives suitable for use in the compounds include, but are not limited to i) fillers; ii) plasticizers; iii) process aids; iv) acid acceptors; v) antioxidants; and vi) antiozonants.

EXAMPLES

Test Methods

Weight percent Cl and S incorporated in chlorosulfonated copolymers was measured by the Schoniger combustion method (J. C. Torr and G. J. Kallos, *American Industrial Association J.* July, 419 (1974) and A. M. MacDonald, *Analyst*, v86, 1018 (1961)).

The percent of —$SO_2Cl$ groups converted to —$SO_3M$ groups was estimated by titration of unreacted residual base or by utilizing Infrared Spectroscopy and examining the absorption regions for the —$SO_2Cl$ and —$SO_3M$ groups.

All the ethylene/alpha-olefins employed in the following examples contained 45-80 weight percent ethylene and had a ratio of Mw/Mn less than 3.5.

Example 1

A chlorosulfonated ethylene/octene-1 copolymer blend (CSM 1) was prepared by the $Cl_2/SO_2$ procedure. 50 pounds (22.7 kg) of a solvent consisting of 90 weight percent (wt. %) carbon tetrachloride and 10 wt. % chloroform was added to a 10-gallon (37.9 liter), jacketed reaction vessel fitted with a condenser and pressure control. 0.83 pounds (0.376 kg) of ethylene/octene-1 copolymer (Engage® 8150, available from The Dow Chemical Co., having a melt index of 0.5 g/10 minutes (min.) and a density of 0.868 g/cm$^3$) and 3.17 pounds (1.44 kg) of ethylene/octene-1 copolymer having a melt index of 30 g/10 minutes and density of 0.870 g/cm$^3$ (Engage® 8407, available from The Dow Chemical Co.) was then added to the reactor. Next, 10 g of thionyl chloride was added to remove moisture from the reactor contents. 2 g of Vazo® 52 initiator (2,2'-azobis(2,4-dimethylpentane nitrile), available from DuPont) dissolved in 10 ml of chloroform was then added to the reactor. The reactor was closed and sparged with nitrogen at about 10 liters/minute for 20 minutes to remove air. The reaction mass was sparged with sulfur dioxide and then pressured to 2 psig (13.8 kPa) with sulfur dioxide and increased to 20 psig (138 kPa) with nitrogen. The reactor content was then heated, with steam on the reactor jacket, to 85° C. for 30 minutes to dissolve the polymer. The reaction temperature was then lowered to 55°-60° C. using a steam water mixture through the reactor jacket. While maintaining the reaction temperature at 55°-60° C., a 0.7 wt. % solution Vazo® 52 initiator in chloroform was added continuously at a rate of 200 ml per hour throughout the reaction. Chlorine gas was then sparged into the reactor at a rate of 0.1 lbs/hour (45.3 g/hour) and sulfur dioxide was added at a rate of 1.4 lbs (0.64 kg)/hour until 0.25 lbs (0.11 kg) of chlorine and 3.5 lbs (1.59 kg) of sulfur dioxide had been added, maintaining a reaction temperature of 55°-60° C. throughout. A sample of reactor solution was taken for analysis. The product contained 1.06 wt % sulfur and 1.81 wt. % chlorine. The reaction mass was degassed by sparging a low flow of nitrogen into the reactor for 5 minutes, followed by vacuum for 30 minutes. The reaction product was stabilized by addition of 18 g of Epon® 828 (a condensation product of epichlorohydrin and bisphenol A, available from Hexion Specialty Chemicals) and 0.9 g of Irganox® 1010 (available from Ciba Specialty Chemicals). The polymer was isolated from the solvent by pouring onto steam heated drums and doctoring the film with a doctor blade, to recover the chlorosulfonated polymer.

A partially neutralized copolymer of the invention (Polymer 1) was made from the above chlorosulfonated copolymer (CSM 1) by the following procedure. 307.8 g of chlorosulfonated alpha-olefin dry polymer was dissolved in 3534 g of tetrachloroethylene at 40° C. The resulting solution was 8.0 wt % solids. Next, demineralized water (192.1 g) was added to the polymer solution and the mixture stirred at 25° C. using an Eppenbach homomixer. To the mixture was added 378.4 g of an aqueous emulsion containing surfactant and sodium hydroxide. The procedure for making this emulsion is described below. The mixture of emulsion and chlorosulfonated polymer solution was mixed at high shear rate for one hour. The temperature of the reaction medium increased to 50° C. due to heat of reaction and mechanical heat. The polymer was isolated from the solvent by pouring onto steam heated drums and doctoring the film with a doctor blade, resulting in recovery of about 250 g of isolated sodium sulfonated polymer. A sample was analyzed by FTIR and compared with the original untreated chlorosulfonated polymer. A new peak at 1051 cm$^{-1}$, indicated formation of the sodium sulfonate salt. A shift of the FTIR peak at 1160 to 1171 cm$^{-1}$ indicated a partial disappearance of the sulfonyl chloride functionality.

Preparation of Caustic Emulsion:

The aqueous emulsion of surfactant and caustic employed above to neutralize chlorosulfonated copolymers was prepared by mixing on a laboratory magnetic stirrer as follows. To 830.71 g of stirred demineralized water was added 31.98 g of 50 wt % aqueous sodium hydroxide solution. The reagents were stirred until the solution became homogeneous. Sodium lauryl sulfate surfactant (Duponol WAQE, available from DuPont) (45.97 g) was then added. Finally, 91.34 g of carbon tetrachloride were added and the mixing continued. A creamy aqueous emulsion formed immediately. Agitation was continued for one hour to ensure the mechanical stability of the aqueous emulsion.

Example 2

A chlorosulfonated ethylene/alpha-olefin polymer (CSM 2) was prepared by the sulfuryl chloride procedure. 40 pounds (18.2 kg) of a solvent consisting of 90 wt % carbon tetrachloride and 10 wt % chloroform was added to a 10 gallon (38 L) jacketed reaction vessel fitted with a condenser and pressure control valve. 4.0 pounds (1.82 kg) of an ethylene/octene-1 copolymer (Engage® 8407, available from The Dow Chemical Co., having a melt index of 30 g/10 min. and a density of 0.87 g/cm$^3$) was then added to the reactor. Next 2 g of Vazo® 52 initiator, dissolved in 10 ml of chloroform was added to the reactor followed by 3 ml of DBU (1,8-diazabicyclo[5.4.0] undec-7-ene). The reactor was closed and heated to 68° C. to dissolve the polymer. The reaction mass was then sparged with sulfur dioxide and then pressured to 5 psig (34.5 kPa) with sulfur dioxide and increased to 20 psig (138 kPa) with nitrogen. The polymer solution temperature was then lowered to 55°-60° C. using a steam water mixture through the reactor jacket. While maintaining the reaction temperature at 55°-60° C., a 1 wt % solution of Vazo® 52 in chloroform was added continuously at a rate of 3.33 ml/min. throughout the reaction. 150 ml of sulfuryl chloride was then added at a rate of 40 ml/min. 3.5 minutes after all of the sulfuryl chloride had been added, a vigorous reaction began as indicated by opening of the pressure control valve. After 21 minutes, the pressure control valve closed indicating that reaction was completed. A polymer sample from the reaction was found to contain 1.12 wt % sulfur and 3.95 wt % chlorine. The reactor temperature was increased to 90° C. and the pressure was reduced to atmospheric to remove dissolved byproduct gasses. The resulting degassed solution of chlorosulfonated polymer was stored.

Another chlorosulfonated polyolefin (CSM 3) was made using the procedure described above, except that 2.5 lbs (1.14 kg) of ethylene/butene-1 copolymer (Engage® 7380 from The Dow Chemical Co, having a melt index of 0.3 g/10 min. and a density of 0.87 g/cm$^3$) was used. A total of 75 ml of sulfuryl chloride was used as a chlorosulfonating agent. A polymer sample from the reaction was found to contain 1.08 wt % combined sulfur and 4.0 wt % combined chlorine. The resulting degassed solution of chlorosulfonated polymer was stored.

A sample of chlorosulfonated polyolefin (CSM 4) was made by blending aliquots of CSM 2 and CSM 3 in the polymer weight ratio of 40 parts CSM 2 to 60 parts CSM 3. (1155 g of CSM 2 stored solution and 2990 g of CSM 3 stored solution). 4145 g of the combined solution was transferred to a stirred flask, fitted with a condenser and heated to 71° C. 125 ml of 2-propanol was added, followed by 14.94 g of a 50 wt % aqueous sodium hydroxide solution, while maintaining stirring and heating. A vigorous reaction was indicated by reaction temperature rise and boiling of the solvent: Stirring was continued for 30 minutes. A sample taken from the reaction was analyzed by FTIR and compared with the original untreated chlorosulfonated polymer. A new peak at 1051 cm$^{-1}$ indicated formation of the sodium sulfonate salt. A shift of the FTIR peak at 1160 to 1171 cm$^{-1}$ indicated a partial disappearance of the sulfonyl chloride functionality. Titration of the reacted solution with 0.3 N HCl indicated that approximately 70% of the sulfonyl chloride endgroups had been converted to sodium sulfonate endgroups. 1.6 g of Irganox®

1076 (available from Ciba Specialty Chemicals) was added to the finished polymer solution. The polymer was isolated from the solvent by pouring onto steam heated drums and doctoring the film with a doctor blade, resulting in recovery of about 250 g of isolated sodium sulfonated polymer.

Example 3

Preparation of Chlorosulfonated Ethylene/Propylene Copolymer:

A chlorosulfonated ethylene/propylene copolymer was prepared by using the chlorine gas/$SO_2$ procedure. 60 pounds (27.3 kg) of a solvent consisting of 90 wt % carbon tetrachloride and 10 wt % chloroform was added to a 10 gallon (38 L) jacketed reaction vessel fitted with an agitator, a condenser and pressure control valve. 2,179 g of an ethylene/propylene copolymer (Tafmer® P0080K, available from Mitsui Chemicals, Inc., having a melt flow rate @ 230° C. of 40 g/10 minutes (min.) and a density of 0.870 g/cm (cc)) and 546 g of an ethylene/propylene copolymer (Tafmer® P 0680 available from Mitsui Chemicals, Inc. having a melt flow rate @ 230° C. of 0.5 g/10 min. and a density of 0.870 g/cc ) was added to the solvent filled reactor. The reaction vessel was sparged with nitrogen at 10 liters/min. for 10 minutes at atmospheric pressure to remove air. After sparging, the pressure controller was set at 20 psig (138 kPa). The reactor was heated with jacket steam to 70° C. and maintained at that temperature for 30 minutes to completely dissolve the polymer. The reactor temperature was lowered to 60° C. by steam water mix while maintaining the pressure controller at 20 psig (138 kPa). The reactor was then pressurized to 20 psig (138 kPa) with sulfur dioxide. While maintaining reactor temperature at 60-65° C., a 0.7 wt % solution of Vazo® 52 initiator in chloroform was added at a rate of 200 cc/hour throughout the reaction. Chlorine gas was then sparged into the reactor at a rate of 200 g per hour and sulfur dioxide addition was continued at 400 g/hour until a total of 350 g of chlorine gas was added. A sample of the reaction mass was taken and analyzed by the Schoniger analytical procedure. The product was found to contain 3.66 wt % combined chlorine and 1.1 wt % combined sulfur. The reaction mass was heated to 80° C. and the pressure was reduced to partially remove dissolved gaseous byproducts. Sparging with nitrogen gas at a rate of 10 liters/minute was continued for 15 minutes to further remove by-products. The reaction product was then stabilized by addition of 10 g of Epon® 828 and stored for future use.

Isolation of Chlorosulfonated Ethylene/Propylene Copolymer:

An aliquot of approximately 1500 g of the above solution was taken and the polymer isolated from the solvent by pouring onto steam drums and doctoring the film with a doctor blade to recover approximately 100 g of chlorosulfonated EP polymer containing 3.66 wt % combined chlorine and 1.1 wt % combined sulfur.

Preparation of an Oil Solution of the Chlorosulfonated EP Product:

A 4.0 wt % solution of the above chlorosulfonated EP product was prepared by adding 8 g of the isolated polymer to 200 g of low toxicity mineral oil (Total DF-1 available from TotalFina Great Britain Limited) and agitating on a shaker for 1 hour until all of the polymer was dissolved. The solution was set aside for future use.

Preparation of 20 wt % Fatty Acid Salt Concentrate:

A fatty acid sodium salt concentrate was prepared by adding 150 g of Westvaco 1408 fatty acid (1480 is a tall oil derivative with an equivalent weight of 280 g/equiv. obtained from the Westvaco Company ) to 750 g of water and then while stirring adding 40 g of 50 wt % aqueous sodium hydroxide. The solution was stirred for 1 hour at 50° C. to form a waxy material containing 20 wt % sodium salt and 80 wt % water. This material was set aside for further use.

Preparation of Caustic Emulsion:

A caustic containing emulsion was prepared by mixing 5 g of the above 20 wt % fatty acid salt concentrate, 10 g of water, 1.0 g of 50 wt % sodium hydroxide and 25 g of mineral oil (Total DF-1 ) with a Silverson homomixer for 3 minutes at 3,000 rpm. This material was set aside for future use.

Preparation of Neutralized Chlorosulfonated EP Polymer:

The above 4.0 wt % chlorosulfonated EP polymer oil solution was then stirred using a Silverson Homogenizer at 3,000 rpm and the above caustic emulsion was added while mixing at 3,000 rpm. Additional mixing was continued for 30 minutes resulting in a thick 3.3 wt % neutralized chlorosulfonated EP polymer in oil concentrate which contained 6.0 wt % water. The concentrate exhibited thixotropic behavior being fluid under mixing but becoming very thick and paste-like after stirring had stopped.

A small sample of the resulting partially neutralized chlorosulfonated EP polymer in oil paste ( about 10 g) was then added with agitation into 50 ml of acetone and then agitated for 5 minutes to obtain a polymer sample. The polymer was separated and washed 3 additional times with acetone and dried. The isolated sample was analyzed by FTIR to determine the degree of hydrolysis. Essentially complete hydrolysis was indicated by formation of a peak at about 1050 $cm^{-1}$ which is characteristic of the sodium sulfonate salt and a shift of the normal sulfonyl chloride peak at 1161 $cm^{-1}$ to 1182 $cm^{-1}$.

Example 4

Preparation of Chlorosulfonated Ethylene/Propylene Copolymer:

A chlorosulfonated ethylene/propylene copolymer with 3.8 wt % chlorine and 0.57 wt % sulfur was prepared from Tafmer® P0080K (available from Mitsui Chemicals, Inc. having a melt flow rate @ 230° C. of 40 g/10 min. and a density 0.870 g/cc) and isolated following the procedure of Example 3.

Preparation of an Oil Solution of the Chlorosulfonated EP Product:

A 1.4 wt % solution of the above chlorosulfonated EP product was prepared by adding 2 g of the product to 140 g of low toxicity mineral oil (Total DF-1 available from TotalFina Great Britain Limited) and then agitating on a shaker for 1 hour until all of the polymer was dissolved. The solution was set aside for future use.

Preparation of 20 wt % Fatty Acid Salt Concentrate:

A fatty acid sodium salt concentrate was prepared following the procedure in Example 3. This material was set aside for further use.

Preparation of Fatty Acid Salt Emulsion:

A fatty acid salt emulsion was prepared by adding 1.2 g of the above 20 wt % fatty acid concentrate to 10 g of mineral oil (Total DF-1 ) and 5 g of water with moderate stirring. This material was set aside for future use.

Preparation of Essentially Neutralized Chlorosulfonated EP Polymer:

The above 1.4 wt % chlorosulfonated EP polymer oil solution was then stirred using a Silverson Homogenizer at 3,000 rpm and the above fatty acid salt emulsion was added while mixing at 3,000 rpm. After 5 minutes, the mixture began to thicken indicating that reaction had started to take place. Samples (approximately 5 g) were taken in 5 minute intervals for 25 minutes while the reaction mixture continued stirring and the polymer samples were then isolated as described in Example 3. Polymer samples were analyzed using FTIR analysis. The appearance of a new peak at 1051 cm$^{-1}$ indicated the formation of a sodium sulfonate salt. This peak continued to increase in intensity as the mixing continued concurrent with the appearance of a peak at 1182 cm$^{-1}$ and the peak at 1161 cm$^{-1}$, attributed to the sulfonyl chloride group began to decrease. The peak at 1161 cm$^{-1}$ disappeared from the sample taken after mixing for 20 minutes and the peak at 1051 cm$^{-1}$ ceased to increase. Thus the conversion was essentially completed.

The final solution was placed in a beaker and the temperature was allowed to reach ambient temperature. Brookfield viscosity of this solution was measured at various spindle speeds ranging from 100 to 1 rpm. The viscosity showed a logarithmic increase as the shear rate was decreased indicating a thixotropic behavior of this material in an oil solution.

Example 5

Preparation of Chlorosulfonated Ethylene/Propylene Copolymer:

A chlorosulfonated ethylene/propylene copolymer was prepared by using the chlorine gas/SO2 procedure. 40 pounds (18.2 kg) of solvent consisting of 92 wt % carbon tetrachloride and 8 wt % chloroform was added to a 10 gallon (38 L) jacketed reaction vessel fitted with an agitator, a condenser and pressure control. 1,816 g of an ethylene/propylene polymer (Tafmer® P0080K, available from Mitsui Chemicals, Inc., having a melt flow rate @ 230° C. of 40 g/10 min. and a density 0.870 g/cc) was added to the solvent filled reactor. The reaction vessel was sparged with nitrogen at 10 liters/minute at atmospheric pressure for approximately 20 minutes with agitation to remove air. After sparging, the nitrogen flow was stopped and the reactor pressure controller was set at 20 psig (138 kPa). The reactor was heated with jacket steam to 83° C. and maintained at that temperature for 30 minutes with agitation to completely dissolve the polymer and then the temperature was lowered to 60° C. Maintaining the reactor pressure controller at 20 psig (138 kPa), the reactor was pressured to 2 psig (13.8 kPa) with sulfur dioxide and then with N$_2$ to 20 psig (138 kPa). While maintaining reactor temperature at 61-63° C. throughout the reaction, a 0.7 wt % solution of Vazo® 52 initiator in chloroform was added at a rate of 200 cc/hour throughout the reaction. After ten minutes of initiator addition, chlorine gas was then sparged in the reactor at a rate of 100 g per hour and sulfur dioxide addition was continued at 200 g/hour until a total of 150 g of chlorine gas and 390 g of sulfur dioxide was added. A small sample of the reaction solution was taken and the chlorosulfonated polymer isolated and dried. The product was found to contain 3.7 wt % chlorine and 0.67 wt % sulfur. The reactor pressure was reduced to atmospheric pressure to partially remove dissolved gaseous byproducts. Sparging with nitrogen gas at a rate of 10 liters/minute was conducted for 15 minutes to further remove byproducts. The reaction mass was then stabilized by addition of 10 g of Epon® 828 and stored for future use.

Isolation of Chlorosulfonated Ethylene/Propylene Copolymer;

An aliquot of approximately 1500 g of the above solution was taken and the polymer isolated from the solvent by pouring onto steam drums and doctoring the film with a doctor blade to recover approximately 125 g of chlorosulfonated EP polymer containing 3.7 wt % combined chlorine and 0.67 wt % combined sulfur.

Preparation of 10 wt % Fatty Acid Salt Solution:

A 10 wt % fatty acid salt solution was prepared by adding 5 g of the 20 wt % fatty acid concentrate prepared in Example 3 to 5 g of water with moderate stirring. This solution was set aside for use in preparing Solution E.

Preparation of an Oil Solutions:

Control Solution A:

A control oil solution was prepared by taking a sample of 150 g of mineral oil (EDC 95/11 available from Total Fluides). The solution was set aside for future use in determining solution viscosity vs. shear information.

Control Solution B:

A 2.0 wt % solution of Tafmer® P-0080K was prepared by adding 3 g to 148 g of mineral oil (EDC 95/11 available from Total Fluides) and agitating on a shaker for 1 hour until all of the polymer was dissolved. The solution was set aside for future use in determining solution viscosity vs. shear information.

Control Solution C:

A 2.0 wt % solution of the above chlorosulfonated EP product containing 3.7 wt % chlorine and 0.67 wt % sulfur was prepared by adding 3 g to 148 g of mineral oil (EDC 95/11 available from Total Fluides) and agitating on a shaker for 1 hour until all of the polymer was dissolved. The solution was set aside for future use in determining solution viscosity vs. shear information.

Solution 1:

A 2.0 wt % solution of the above chlorosulfonated EP product containing 3.7 wt % chlorine and 0.67 wt % sulfur was prepared by adding 3 g to 148 g of mineral oil (EDC 95/11 available from Total Fluides) and agitating on a shaker for 1 hour until all of the polymer was dissolved.

This solution was converted to the partially neutralized form by stirring using a Silverson Homogenizer at 3,000 rpm and adding 10 g of the 10 wt % fatty acid salt solution prepared above. Additional mixing was continued for 30 minutes resulting in a thick 1.9 wt % partially neutralized chlorosulfonated EP polymer in oil concentrate. The concentrate exhibited thixotropic behavior by being fluid while under mixing but becoming very thick and paste-like after stirring had stopped. The partially neutralized chlorosulfonated EP product of the invention was set aside for future use in determining solution viscosity vs. shear information.

Control Solution D:

A 2.0 wt % solution of Hypalon® 20 (22 Mooney [ML1+4@ 100° C.] 29 wt % chlorine, 1.40 wt % sulfur available from DuPont Performance Elastomers L.L.C.) was attempted by adding 3 g in the form of small pieces to 148 g of mineral oil (EDC 95/11 available from Total Fluides) and agitating on a shaker for 1 hour. The polymer was not soluble in the mineral oil and stayed as chunks of undissolved polymer suspended in the mineral oil.

The solution viscosity of these solutions was determined by Brookfield Viscometry [Model LVDV-11 with a #2 spindle] at varying spindle speeds from 100 rpm to 1.5 rpm to determine the effects of shear rate at very low shear on solution viscosity. The result are shown in the following table.

| Spindel speed RPM | Control Solution A [viscosity in centipoise] | Control Solution B [viscosity in centipoise] | Control Solution C [viscosity in centipoise] | Solution 1 [viscosity in centipoise] |
|---|---|---|---|---|
| 1.5 | 65 | 75 | 105 | 7400 |
| 3 | 65 | 76 | 100 | 6000 |
| 6 | 64 | 76 | 95 | 4800 |
| 12 | 65 | 75 | 96 | 3400 |
| 30 | 64 | 72 | 94 | 1800 |
| 60 | 63 | 72 | 93 | 750 |
| 100 | 60 | 71 | 90 | 300 |

The results show that the base oil (Control Solution A) has constant viscosity at all spindle speeds. Adding the non-chlorosulfonated base E/P polymer (Control Solution B) increases viscosity slightly but the viscosity is constant with spindle speed. The chlorosulfonated E/P copolymer (Control Solution C) increases the viscosity slightly, but shows almost negligible viscosity change with spindle speed. The chlorosulfonated E/P copolymer, dissolved in mineral oil and then neutralized to a sodium salt (Solution 1 of the invention) shows an increase in viscosity that becomes considerably larger as spindle speed is decreased stepwise from 100 rpm to 1.5 rpm. If spindle speed is then increased, the viscosity reversibly decreases, indicating thixotropic behavior of these partially neutralized chlorosulfonated polymers in oil solutions.

Control Solution D shows that typical chlorosulfonated polymers that contain high levels of chlorine are not soluble in mineral oil and are thus not useful in this type of application. It has been found that chlorine levels of 10 wt % or less are required for this application.

What is claimed is:

1. A chlorosulfonated ethylene copolymer composition comprising at least one chlorosulfonated ethylene copolymer having 0.5 to 10 weight percent chlorine, 0.25 to 5 weight percent sulfur, based on total weight of said chlorosulfonated ethylene copolymer, and a plurality of —$SO_3M$ groups, wherein M is a cation, and wherein said chlorosulfonated ethylene copolymer is produced from a linear olefin copolymer comprising copolymerized units of 45 to 80 weight percent ethylene and 55 to 20 weight percent, based on total weight of said linear olefin copolymer, of an alpha-olefin having 3 to 20 carbon atoms, said linear olefin copolymer having a ratio of Mw/Mn less than 3.5.

2. A chlorosulfonated ethylene copolymer composition of claim 1 wherein said alpha-olefin is selected from the group consisting of octene-1, butene-1 and propylene.

3. A chlorosulfonated ethylene copolymer composition of claim 2 wherein said alpha-olefin is octene-1.

4. A chlorosulfonated ethylene copolymer composition of claim 2 wherein said alpha-olefin is butene-1.

5. A chlorosulfonated ethylene copolymer composition of claim 2 wherein said alpha-olefin is propylene.

6. A chlorosulfonated ethylene copolymer composition of claim 1 wherein said linear olefin copolymer has a density between 0.85 and 0.91 g/cm$^3$.

7. A chlorosulfonated ethylene copolymer composition of claim 1 wherein said weight percent chlorine is between 0.75 and 8 and wherein said weight percent sulfur is between 0.35 and 3.

8. A chlorosulfonated ethylene copolymer composition of claim 7 wherein said weight percent chlorine is between 1 and 5 and wherein said weight percent sulfur is between 0.5 and 2.

9. A chlorosulfonated ethylene copolymer composition of claim 1 wherein M is a cation selected from the group consisting of Na$^+$, K$^+$, Li$^+$, Ca$^{2+}$, Al$^{3+}$ and cations of tertiary amines.

10. A chlorosulfonated ethylene copolymer composition of claim 1 comprising at least 2 chlorosulfonated ethylene copolymers, each having 0.5 to 10 weight percent chlorine, 0.25 to 5 weight percent sulfur, based on total weight of each said chlorosulfonated ethylene copolymer, and a plurality of —$SO_3M$ groups, wherein M is a cation, and wherein each of said chlorosulfonated ethylene copolymers is produced from a different linear olefin copolymer comprising copolymerized units of 45 to 80 weight percent ethylene and 55 to 20 weight percent, based on total weight of said linear olefin copolymer, of an alpha-olefin having 3 to 20 carbon atoms, said linear olefin copolymer having a ratio of Mw/Mn less than 3.5.

* * * * *